Dec. 16, 1969  H. P. TROUNSTINE ET AL  3,484,835
EMBOSSED PLASTIC FILM
Filed June 25, 1968
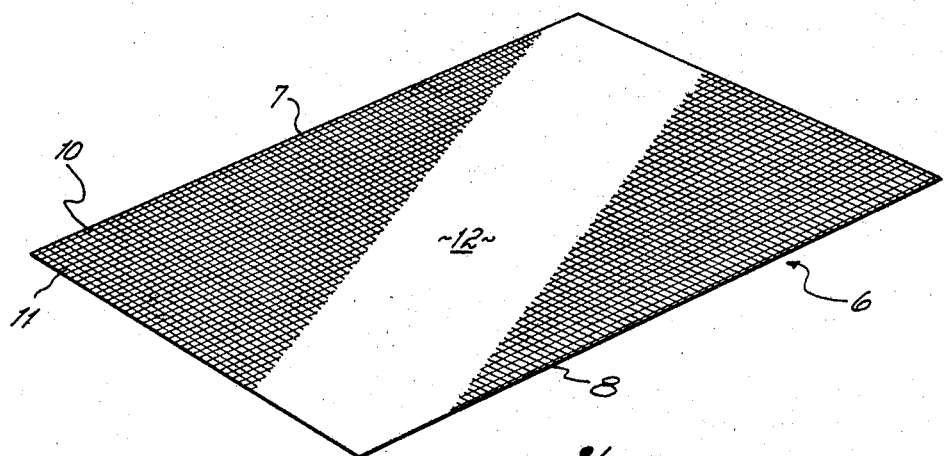
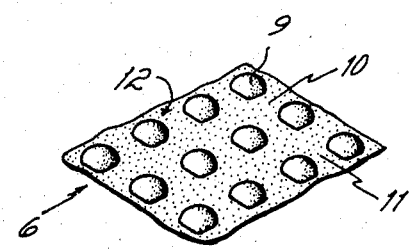
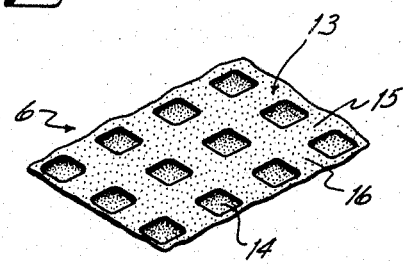
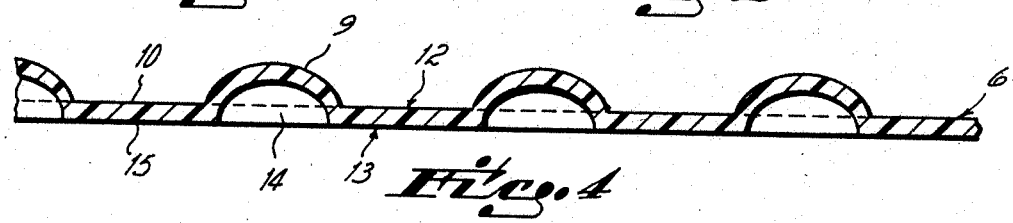
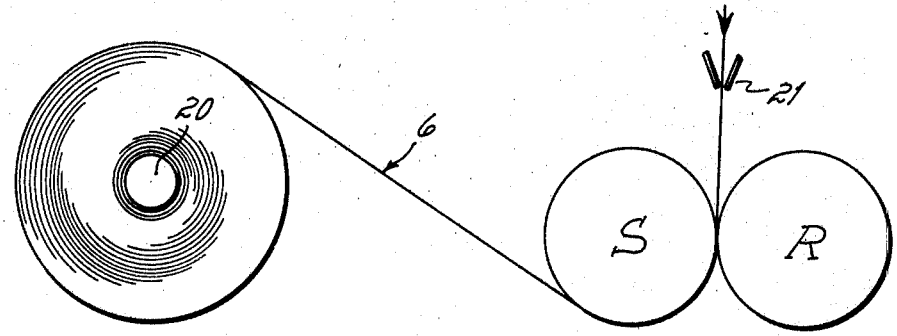
INVENTORS
Henry P. Trounstine
BY Thomas M. McCauley
Wood, Herron & Evans
ATTORNEYS

United States Patent Office 3,484,835
Patented Dec. 16, 1969

3,484,835
EMBOSSED PLASTIC FILM
Henry P. Trounstine, Cincinnati, Ohio, and Thomas M. McCauley, Fort Thomas, Ky., assignors to Clopay Corporation, Cincinnati, Ohio, a corporation of Maryland
Filed June 25, 1968, Ser. No. 739,875
Int. Cl. B32b 3/30; D06n 7/04
U.S. Cl. 161—130                                    1 Claim

ABSTRACT OF THE DISCLOSURE

A plastic film having a permanently embossed design which simulates a plain woven fabric or cloth and has edge-curl resistance under machine stress. The embossed film is particularly suited for the manufacture of sheet materials or composite articles thereof such as covers for disposable diapers, water-repellent clothing, and the like, which require a surface having moisture barrier characteristics and also having the appearance of woven fabric.

BACKGROUND OF THE INVENTION

Plastic film or sheet material has achieved widespread use in the fabrication of many useful articles, quite often as a replacement material for woven fabrics. Particular utility for plastic film has been found in the area of waterproof clothing or covering materials because of the moisture barrier character of the plastic film. However, in order for plastic film to have the visual appeal of woven fabric, its surface must be provided with a woven texture. This is usually done by methods of embossing the surface of the film to simulate the appearance of a woven fiber.

One example of a design which has heretofore been proposed to simulate a woven fabric consists of a pattern of diamond-shaped bosses in the plastic film in relief of the film surface. The diamond-shaped bosses are formed in the film such that the sides of the diamonds are integral with channels which extend diagonally to the edges of the sheet. This pattern and others like it which attempt to simulate a woven fabric have proved to be deficient in several essential respects. The main disadvantage of plastic films of this type is their propensity to edge-curl when subjected to the rather slightest pull or stress in their lengthwise direction. This problem of edge-curl has placed a serious handicap upon the use of embossed plastic films in high speed production machinery which is usually required to handle the films either when embossing them or when fabricating them with other sheet materials to make useful articles such as covers for diaper pads, hospital bed pads and water-repellent clothing.

The disadvantages associated with edge-curling of plastic film are typically demonstrated in the production of diaper pads where high speed machinery must deliver the film material to a laminating area, cut it to a certain length, and then glue or seal its edges to an absorbant backing material to produce the finished diaper. During these operations, edge-curling causes the overlapping and funneling of the lengthwise edges of the plastic film material thereby resulting in inefficient edge-sealing, nonuniform dimensions in the cut film and nonconformance of the film with backing materials.

Therefore, there is a need for an embossed plastic film which permits effective utilization of the advantageous moisture barrier characteristics of the plastic and at the same time provides a finished surface which simulates a plain woven fabric. This embossed film must also be readily adaptable for use in high speed embossing equipment or fabricating equipment and be able to withstand the normal machine handling stresses without edge-curling, disadvantageous elongation and dimensional distortion.

SUMMARY OF THE INVENTION

This invention is predicated upon the simple but unobvious discovery that a plastic film material can be provided with a plain woven fabric pattern having a fine rib closely simulating a taffeta design of the type usually found in woven fabrics, but without the disadvantages usually heretofore associated with known designs. Particularly, it has been found that when a plastic film is provided with a series of raised bosses between substantially perpendicularly intersecting longitudinal and lateral channel-like areas which perpendicularly intersect the free edge of the plastic film, the problem of edge-curling is for all practical purposes eliminated.

Moreover, the embossed plastic film of this invention gives the visual appearance of a plain woven taffeta cloth without the shiney surface effect heretofore usually experienced in known embossed films. Moreover, the embossed plastic film of this invention is edge-curl resistant and dimensionally stable to such an extent that it can be made or handled on high speed machinery, easily cut to length and glued on its edges, all without disadvantageously effecting machine operation.

In a preferred form embodying the principles of this invention, a length of plastic film whose free edges substantially parallel one another has an embossed design comprising a series of raised bosses separated by perpendicularly intersecting longitudinal and lateral channel-like areas on the top side of the film. On the opposite side of the film there is provided a series of depressed areas enclosed by substantially perpendicularly intersecting longitudinal and lateral ridges. The bosses on the top side of the film overlie the depressions on the underside and, similarly, the top side channels overlie the underside ridges. Both the channel-like areas and their counterpart ridges extend substantially perpendicular to the free edges of the film. It is necessary that the embossed plastic film of this invention have the bosses or raised areas separated by a network of channels which extend substantially perpendicular to the free edges of the film. This network has been found essential for edge-curl resistance in the embossed film.

In another of this invention's aspects, and in order to achieve a simulated fine rib woven fabric, the channel-like areas of the film are spaced apart at regular intervals to form a network of generally rectangular-shaped channels separating the raised bosses. The raised bosses in this patern are somewhat rounded and have substantially rectangular or square borders integral with the channel-like areas. This network provides a soft fabric-like tone.

The embossed plastic film of this invention is made from suitable plastic materials, preferably of the thermoplastic polyolefin type and particularly, polyethylene, polypropylene; copolymers of polyolefins such as ethylene-vinyl acetate copolymers; or modified polyolefin polymers such as polyethylene or polypropylene modified with conventional fillers and the like. The thickness of the film can vary over a wide range. The advantages of this invention have been secured with films having thicknesses of about 0.00075 inch to about 0.008 inch, but these limitations are not critical. These plastic films can be embossed with the design of this invention according to any of a number of well-known techniques. Basically, embossing can be performed in two main ways, i.e., either by the introduction of a pre-formed film into a system of embossing rolls or by the introduction of an extruded melt of plastic material through a slot-die between the embossing rolls. Either method involves the introduction of thermoplastic material in an elastic state between usually a steel embossing roll and a smooth resilient roll which form a nip for embossing the film. These techniques are considered conventional and, to the extent that they are referred to herein as being conventional, it is to be understood that they are embodied in this description.

The advantages and objects of this invention will be further understood by reference to the drawings in which:

FIGURE 1 illustrates a perspective view of a plastic film or sheet embodying an embossed design according to this invention.

FIGURE 2 is a magnified fragmentary perspective view of the film of FIGURE 1.

FIGURE 3 is the underside of the view in FIGURE 2.

FIGURE 4 is a transverse cross-sectional view of the film in FIGURE 1 further magnified and taken along a central portion of a series of bosses.

FIGURE 5 is a diagrammatic view in side elevation of a system of embossing rolls together with a wind-up roll to illustrate a technique of embossing a plastic film material with a design according to this invention.

With reference to the drawings, the film 6 of FIGURE 1 depicts a suitable plastic sheet material such as thermoplastic polyolefin material of the polyethylene or polypropylene type having an embossed design of this invention. This film material can have a thickness in the range of about 1 mil to about 8 mils, more or less, as mentioned above. The embossed pattern is better illustrated by magnification of the microscopic boss structure as shown in FIGURES 2–4. As shown, the length of the plastic film has free lengthwise edges 7, 8 substantially parallel to one another. A series of raised bosses 9 are separated by substantially perpendicularly intersecting longitudinal 10 and lateral 11 channel-like areas on the top side 12 of the film. On the opposite or underside 13 of the film is a series of depressed areas 14 enclosed by substantially perpendicular intersecting longitudinal 15 and lateral 16 ridges. The bosses 9 in the top side 12 of the film overlie the depressed areas 14 and the top side channel-like areas 10, 11 overlie the underside ridges 15, 16 (as shown in FIGURE 4). Both the lateral channel-like area 11 and lateral ridge 16 extend substantially perpendicular to the film's free edges 7, 8. As mentioned, it has been found essential to this invention that the fine rib design be constituted by channel area 11 and ridge 16 which are substantially perpendicular to the free edges 7, 8 to eliminate edge-curl for practical purposes.

The intersecting channel-like areas 10, 11 (and their counterpart ridges 15, 16) extend at regular intervals across the entire surfaces of film 6 to define a network of generally rectangular-shaped channel areas, each rectangular-shaped channel area integrally borders and separates the raised bosses 9 formed in the film surface. Each boss 9 is raised in relief of the rectangular channel areas 10, 11 to provide a somewhat rounded protrusion having a substantially rectangular or square border. This embossed pattern on the film top side 12 as shown in FIGURE 2 simulates a plain woven taffeta fabric with fine ribs and has a soft-toned appearance. The underside 13 of the film 6 is shown more particularly in FIGURE 3 as comprising depressions 14 having substantially rectangular or square-shaped outer margins terminating in rounded bottoms. Depressions 14 are enclosed by ridges 15, 16. Dimensionally, for example, the channel areas 10, 11 have a width of about 0.010 inch separating boses which span a similar dimension in the film surface between opposite sides of each boss 9.

The embossed pattern in the film 6 of the drawings is formed, for example, by embossing a plastic film with a system of embossing rolls as diagrammatically shown in FIGURE 7. One of the rolls is a steel roll S whose surface is embossed as by conventional engraving methods with a pattern of substantially square protrusions having rounded upper corners (not shown) extending between horizontally and laterally extending grooves. For instance, the grooves in the steel roll are engraved to a depth of about 0.010 to 0.012 inch. The steel roll engraved pattern substantially corresponds to the underside 13 of the finished embossed film 6. The other roll of the embossing roll system is a resilient or rubber roll R which presents a resilient surface for co-action with the non-resilient steel roll S when impressing the steel roll pattern into the film 6. The speed of the rubber and steel rolls is maintained to permit continuous embossing of film 6 with the embossed design according to this invention for subsequent take-up upon a wind-up roll 20.

A preferred technique for producing the embossed film 6 according to this invention employs a slot-die extrusion means, indicated generally at 21. For example, thermoplastic polyethylene material is heated to a temperature of about 300°–350° F. and then introduced in web form from the slot 21 into the nip of the steel S and rubber R rolls. The plastic material upon being introduced between the nip of the rolls is film formed and at the same time printed with the embossed pattern of the steel embossing roll S. The steel roll S under suitable pressure depresses into the rubber roll R to produce a thin film having the embossed design. For example, when a polyethylene film is to be produced having a thickness of about 0.001 inch with bosses having a height of about 0.003 to 0.004 inch above the channel-like areas 10, 11 of the film, a pressure of about 30 p.s.i. is maintained between the nip of the rolls where the steel roll S is engraved to a depth of about 0.012 inch and the rubber roll R has a hardness of about 50 durometer. In achieving film thicknesses and boss heights, conditions are controlled in a manner well within the skill of those knowledgeable in the art of producing embossed films. The factors which are considered may be varied depending upon the plastic material used, the height of the boss to be achieved, and the characteristics to be obtained in the resultant film. Generally, the process conditions which are controlled to produce the embossed film include the temperature of the melt of thermoplastic material which is introduced between the steel and rubber rolls, the pressure exerted at the nip of the steel and rubber rolls, the depth of the engraved design on the steel roll and the hardness of the resilient material of the rubber roll.

An embossed polyethylene film produced according to the method just described includes a series of raised bosses 9 which protrude above the channel-like areas 10, 11 to a height of about 3 to 4 times the thickness of the film. For example, it has been found that with a sheet of polyethylene having a thickness on the order of about 0.001 inch, the raised bossed areas are advantageously formed having a height of about 0.003 to 0.004 inch extending above the channel-like areas 10, 11. Below a boss height of about 0.003 inch with a polyethylene film having a thickness of about 0.001 inch, the surface of the plastic film tends to be shiny. Above a boss height of about 0.004 inch in this same sheet material, the film will tend to more readily elongate under stress. This elongation tendency is primarily due to the fact that increased pressure on the plastic film between steel roll protrusions and rubber roll causes the plastic to be thinner or strained in the boss areas. Of course, when other thermoplstic material such as polypropylene is used in thicknesses of about 0.001, the height of the bosses can be increased above 0.004 inch without causing increased elongation tendencies because of the inherently stiffer properties of polypropylene.

In general, when working with thermoplastic films having thicknesses on the order of 1 mil to about 8 mils, it is found desirable to form the bosses at a height of about 0.003 to about 0.012 inch, preferably 0.003 to about 0.004 inch. The height of this boss gives the appearance of a fine ribbed woven fabric without a shiny surface. It is to be understood, of course, that the thicknesses of the film as well as the height of the bosses can be varied in accord with this description and within the skill of the art.

The above description of the plastic film embodying the principles according to this invention is by way of illustration and not limitation. It will be obvious that there are other equivalent forms of the invention which employ the advantageous properties and results achieved in the embossed film of this invention without departing from the spirit and scope thereof.

What is claimed is:

1. An embossed length of thermoplastic film of about 1 mil in thickness, said thermoplastic is selected from the group consisting of polyethylene, polypropylene and copolymers thereof, whose free lengthwise edges substantially parallel one another and have edge-curl resistance under machine stress in their lengthwise direction, the embossed design simulating taffeta woven cloth without a shiny surface surface effect comprising, a series of raised bosses separated by substantially perpendicularly intersecting longitudinal and lateral channel-like areas on the top side of said film, said channel-like areas being spaced apart about 0.010 inch to form a network of generally rectangular-shaped channels separating said raised bosses, said raised bosses protrude above said channel-like areas to a height in the range of about 0.003 to about 0.004 inch, said network providing a soft fabric-like tone without a shiny surface effect, and on the opposite side thereof, a series of depressed areas enclosed by substantially perpendicularly intersecting longitudinal and lateral ridges, said bosses overlie said depressed areas, said channel-like areas overlie said ridges, both said lateral channel-like areas and said lateral ridges extending substantially perpendicular to said free edges.

References Cited

UNITED STATES PATENTS

| | | | |
|---|---|---|---|
| Re. 23,910 | 12/1954 | Smith et al. | 264—92 |
| 2,446,771 | 8/1948 | Knowland. | |
| 2,776,452 | 1/1957 | Chavannes. | |
| 3,281,257 | 10/1966 | Rosen. | |
| 3,060,515 | 10/1962 | Corbett. | |

ROBERT F. BURNETT, Primary Examiner

W. W. SCHWARZE, Assistant Examiner

U.S. Cl. X.R.

161—164, 165; 264—284